US012754790B1

(12) United States Patent
Chang et al.

(10) Patent No.: US 12,754,790 B1
(45) Date of Patent: Oct. 6, 2026

(54) MITIGATION OF BLUE SCREEN OF DEATH ERROR ON A COMPUTER

(71) Applicant: Trend Micro Incorporated, Tokyo (JP)

(72) Inventors: Matthew Chang, Taipei (TW); Sean S Hsu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 18/668,675

(22) Filed: May 20, 2024

(51) Int. Cl.
*G06F 11/07* (2006.01)

(52) U.S. Cl.
CPC ........ *G06F 11/076* (2013.01); *G06F 11/0709* (2013.01)

(58) Field of Classification Search
CPC ............................ G06F 11/076; G06F 11/0709
See application file for complete search history.

(56) References Cited

U.S. PATENT DOCUMENTS 8,438,423 B1 * 5/2013 Barkelew ............ G06F 11/1417 714/36
11,113,147 B2 * 9/2021 Kulick .................. G06F 11/366
11,704,180 B2 * 7/2023 Zhang ................. G06F 11/0727 714/6.11
2015/0261598 A1 * 9/2015 Balasubramanian ........................ G06F 11/0709 714/10
2020/0334102 A1 * 10/2020 Abdelhalim .......... G06F 9/4406
2020/0394049 A1 * 12/2020 Eder ................... G06F 9/45558

OTHER PUBLICATIONS

"Blue screen of death", Wikipedia, https://en.wikipedia.org/wiki/Blue_screen_of_death, Downloaded Dec. 18, 2023.
"Advanced troubleshooting for Event ID 41: 'The system has rebooted without cleanly shutting down first'", Microsoft Learn, https://learn.microsoft.com/en-us/troubleshoot/windows-client/performance/event-id-41-restart, Downloaded Dec. 20, 2023.
"Extended detection and response", Wikipeida, https://en.wikipedia.org/wiki/Extended_detection_and_response, Downloaded Dec. 18, 2023.
"Overview of memory dump file options for Windows", Microsoft Learn, https://learn.microsoft.com/en-us/troubleshoot/windows-server/performance/memory-dump-file-options#/registry-values-for-startup-and-recovery, Downloaded Dec. 20, 2023.
"Understanding the Registry on Windows", UConn Knowledge Base, https://kb.uconn.edu/space/IKB/10737647782/Understanding+the+Registry+on+Windows, Downloaded Dec. 15, 2023.
"User mode and kernel mode", Microsoft Learn, https://learn.microsoft.com/en-us/windows-hardware/drivers/gettingstarted/user-mode-and-kernel-mode, Downloaded Dec. 18, 2023.

(Continued)

*Primary Examiner* — Jigar P Patel
(74) *Attorney, Agent, or Firm* — Beyer Law Group LLP

(57) ABSTRACT

A blue screen of death (BSoD) error is mitigated in an endpoint computer. A kernel driver on the endpoint computer starts when the kernel driver is stable and does not start when the kernel driver is not stable, such as when the kernel driver has crashed. After the malfunction causing the BSOD error is mitigated, a backend system can send a command to the endpoint computer to force an engine to initialize and start the kernel driver.

12 Claims, 5 Drawing Sheets

(56) References Cited

OTHER PUBLICATIONS

"What is extended detection and response (XDR)?", Microsoft Security, https://www.microsoft.com/en-us/security/business/security-101/what-is-xdr, Downloaded Dec. 18, 2023.
"Windows Registry", Wikipedia, https://en.wikipedia.org/wiki/Windows Registry#:~:text=Depending%20upon%20the%20version%20of,hive%20is%20stored%20in%20Ntuser, Downloaded Dec. 18, 2023.

* cited by examiner

MITIGATION OF BLUE SCREEN OF DEATH ERROR ON A COMPUTER

TECHNICAL FIELD

The present disclosure is directed to mitigation of blue screen of death errors on computers.

BACKGROUND

A blue screen of death (BSoD) error, which is also referred to as "black screen" error or "stop code" error, is a fatal system error on the MICROSOFT WINDOWS operating system. A BSOD error indicates a system crash in which the operating system has reached a critical condition where the operating system has to stop operating. A BSOD error is not caused by an application crash, but typically by malfunctioning kernel drivers and hardware components. A BSOD error can loop, thereby preventing the computer from booting normally. That is, a BSOD loop can cause the computer to keep rebooting, making troubleshooting very difficult.

A kernel driver comprises program code that runs in kernel mode. Kernel drivers may be employed to perform system behavior monitoring, access hardware devices, and other operations that require kernel-level privileges. Kernel drivers can thus perform operations that are not available to user mode programs. As a consequence, a malfunctioning kernel driver can cause a BSOD error. A kernel driver may malfunction because of various reasons including an error in the program code of the kernel driver and interoperability issues with other kernel drivers. The chance that a kernel driver crashes and thereby cause a BSOD error is especially high when the kernel driver is newly installed or updated.

BRIEF SUMMARY

In one embodiment, a method of mitigating a blue screen of death error on a computer includes installing a kernel driver and thereafter starting the kernel driver. An incidence count is compared to a threshold when the kernel driver is started. When the incidence count is less than the threshold: the incidence count is incremented, operations of the kernel driver are performed after incrementing the incidence count, the incidence count is reset after receiving a stop signal to stop the kernel driver, and the kernel driver is stopped after resetting the incidence count. When the incidence count is equal to or greater than the threshold: an indication that the kernel driver fails to start is made and the kernel driver is stopped.

In another embodiment, a computer comprises at least one processor and a memory, the memory storing instructions that when executed by the at least one processor cause the computer to: install a kernel driver; start the kernel driver after installing the kernel driver; check a stability status of the kernel driver; when the stability status of the kernel driver indicates that the kernel drive is not stable, stop the kernel driver; and when the stability status of the kernel driver indicates that the kernel drive is stable, perform operations of the kernel driver.

In yet another embodiment, a system for mitigating a blue screen of death error comprises an endpoint computer and a backend system. The endpoint computer is configured to: install a kernel driver; start the kernel driver after installing the kernel driver; check a stability status of the kernel driver; when the stability status of the kernel driver indicates that the kernel drive is not stable, stop the kernel driver; and when the stability status of the kernel driver indicates that the kernel drive is stable, perform operations of the kernel driver. The backend system is configured to receive a report from the endpoint computer that the kernel driver fails to start; and provide a policy setting to the endpoint computer.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
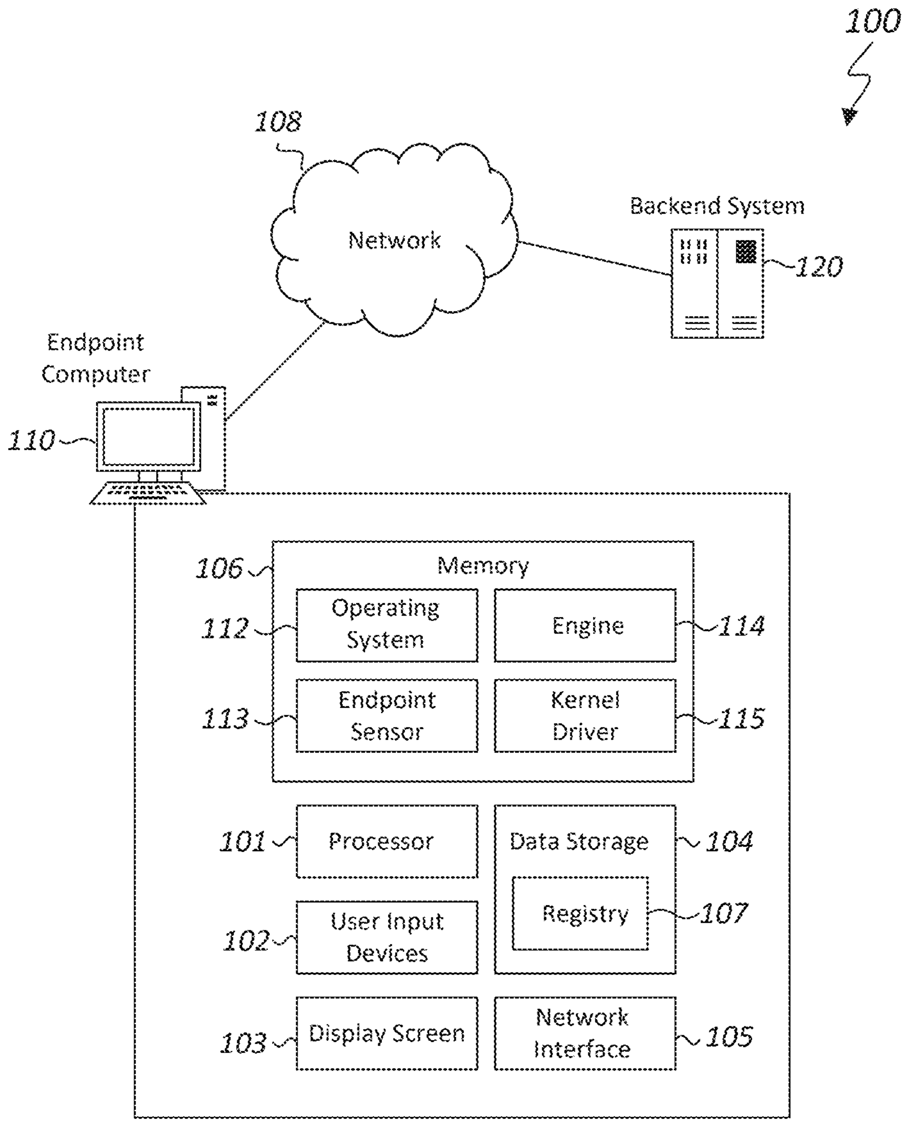
FIG. 1 shows a block diagram of a system for mitigating blue screen of death (BSoD) errors on a computer, in accordance with an embodiment of the present invention.

FIG. 1 shows a block diagram of a system 100 for mitigating blue screen of death (BSoD) errors on a computer, in accordance with an embodiment of the present invention.

The system 100 comprises an endpoint computer 110 and a backend system 120. The endpoint computer 110 may comprise a laptop computer, a desktop computer, a workstation, or other computer system. The endpoint computer 110 includes at least one processor 101 (e.g., an INTEL processor, an AMD processor), user input devices 102 (e.g., keyboard, mouse, tablet), a display screen 103 (e.g., liquid crystal display monitor), one or more non-volatile data storage devices 104 (e.g., hard drive, solid state drive, flash memory), a network interface 105 (e.g., Ethernet card, modem), and a main memory 106 (e.g., dynamic random-access memory). The endpoint computer 110 may have fewer or more components to meet particular requirements.

The memory 106 stores instructions of an operating system 112, an endpoint sensor 113, an engine 114, and a kernel driver 115. In one embodiment, the operating system 112 is the MICROSOFT WINDOWS operating system.

Instructions stored in the memory 106, when executed by the at least one processor 101, cause the endpoint computer 110 to operate as disclosed herein.

Files (not shown) of the operating system 112, endpoint sensor 113, engine 114, and kernel driver 115 are stored in the data storage device 104. The data storage device 104 also stores files of a registry 107 of the MICROSOFT WINDOWS operating system.

In one embodiment, the backend system 120 comprises hardware and software components for providing an extended detection and response (XDR) service to one or more endpoint computers 110. An XDR service is a well-known type of cybersecurity service, wherein a plurality of endpoint computers are monitored to detect and respond to cyber threats, such as ransomware, computer viruses, phishing, etc. XDR services are available from various cybersecurity vendors, including Trend Micro Incorporated, which is the assignee of the present disclosure. Embodiments of the present invention may be incorporated in currently-available XDR services or other systems or service that have endpoint monitoring. It is to be noted that embodiments of the present invention are generally applicable to other use cases that require mitigation of BSOD errors.

The backend system 120 may be implemented on a cloud computing platform (e.g., Amazon Web Services™ platform) or a dedicated computer system. The backend system 120 and the endpoint computer 110 communicate over a computer network 108, which in one embodiment includes the public Internet.

In one embodiment, the backend system 120 monitors the endpoint computer 110 by way of the endpoint sensor 113. That is, the endpoint sensor 113 monitors the endpoint computer 110 and reports back to the backend system 120. The endpoint sensor 113 may operate in conjunction with other software modules to perform monitoring, including the engine 114 and the kernel driver 115.

In one embodiment, the engine 114 is a system behavior monitoring engine. Examples of system behaviors monitored by the engine 114 include file access, application programming interface (API) invocations, inter-process communications, etc. on the endpoint computer 110. Because the endpoint sensor 113 and the engine 114 are user mode programs, they are limited in what they can detect and intercept on the endpoint computer 110.

As its name indicates, the kernel driver 115 runs in kernel mode, allowing the engine 114 to effectively monitor the system behavior of the endpoint computer 110. In one embodiment, the kernel driver 115 is configured to detect and/or intercept system behavior, and report the detection and/or interception to the engine 114. Because the kernel driver 115 operates in kernel mode, a malfunctioning kernel driver 115 can cause a BSOD error on the endpoint computer 110. Typically, a BSOD error will loop, causing the endpoint computer 110 to repeatedly reboot.

To prevent a BSOD loop, the kernel driver 115 does not attempt to operate to perform its function (i.e., monitor system behavior) after a predetermined number of failed starts (e.g., one failed start). More particularly, after the predetermined number of failed starts, starting the kernel driver 115 causes the kernel driver 115 to stop instead of continue operating. In one embodiment, the engine 114 starts the kernel driver 115 as part of the initialization of the engine 114. Accordingly, the engine 114 cannot initialize successfully when the kernel driver 115 fails to start.

The endpoint sensor 113 reports the failed initialization of the engine 114, because of the failed start of the kernel driver 115, to the backend system 120. The engine 114 may collect telemetry data of the failed start of the kernel driver 115. The telemetry data may include a MICROSOFT WINDOWS Event ID 41 notification of the endpoint computer 110. The endpoint sensor 113 may receive the telemetry data from the engine 114, and forward the telemetry data to the backend system 120. Support personnel may use the telemetry data to troubleshoot the failed start of the kernel driver 115, which is due to an incidence of a BSOD error involving the kernel driver 115. After the BSOD error has been resolved, e.g., after patching the kernel driver 115, a command may be sent from the backend system 120 to the endpoint computer 110 to force the engine 114 to initialize and start the kernel driver 115. The command may be sent as a policy setting to be enforced at the endpoint computer 110.

Figure 2:
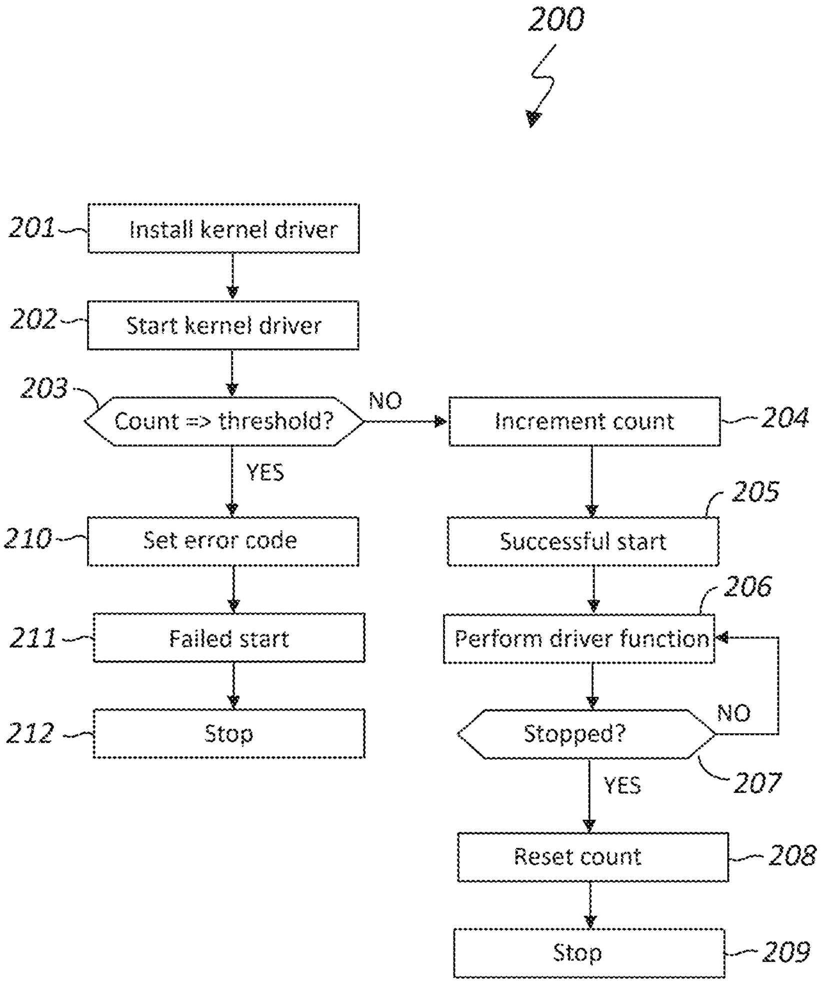
FIG. 2 shows a flow diagram of a method of preventing a BSoD loop, in accordance with an embodiment of the present invention.

FIG. 2 shows a flow diagram of a method 200 of preventing a BSoD loop, in accordance with an embodiment of the present invention. The method 200 may be performed to prevent a BSOD error from repeatedly occurring on the endpoint computer 110.

In step 201, the kernel driver 115 is installed using a suitable MICROSOFT WINDOWS API for installing kernel drivers.

In step 202, the kernel driver 115 is started, which in one embodiment is by the engine 114. Once started, the kernel driver 115 can proceed to perform operations in accordance with its function, which in one embodiment is to monitor system behavior on the endpoint computer 110. In one embodiment, the kernel driver 115 is a software driver that has no associated hardware device. The engine 114 can send signals to the kernel driver 115 by sending input/output (I/O) control codes to the kernel driver 115. The kernel driver 115 can send notifications and other data of monitored system behavior to the engine 114.

In step 203, after being started, the kernel driver 115 compares an incidence count to a predetermined threshold. An incidence count indicates a number of times the kernel driver 115 crashed due to a malfunction. In one embodiment, the incidence count is tracked using an incidence counter that is stored in the registry 107. This allows the incidence count to remain even after reboots of the endpoint computer 110. In one embodiment, the predetermined threshold is equal to one.

In step 203 to step 204, the kernel driver 115 increments the incidence count when the incidence count is less than the threshold.

In step 205, the kernel driver 115 starts successfully. The Engine 114 is aware of the successful start of the kernel driver 115 by the absence of error code in the registry 107.

In step 206, the kernel driver 115 begins to operate in accordance with its function after incrementing the incidence count. Incrementing the incidence count leaves a telltale sign in case the kernel driver 115 crashes and causes a BSOD error before the kernel driver 115 gracefully (i.e., normally) stops.

In step 207 to step 206, the kernel driver 115 continues to operate to perform its function until the kernel driver 115 receives a stop signal from the engine 114 (or other component).

In step 207 to step 208, the kernel driver 115 resets the incidence count responsive to receiving a stop signal from the engine 114. In one embodiment, the incidence count is reset to zero. The engine 114 may stop the kernel driver 115 using a suitable MICROSOFT WINDOWS API for stopping a kernel driver.

In step 209, the kernel driver 115 stops after resetting the incidence count.

When the kernel driver 115 malfunctions before receiving a stop signal, the incidence count will be at least equal to the threshold of one, which will be detected by the kernel driver 115 in step 203. In response, the kernel driver 115 makes an indication that the kernel driver 115 fails to start by setting an error code in step 210. The engine 114 checks the error code at the next initialization of the engine 114 to detect the failure to start.

More particularly, in step 210, the kernel driver 115 sets an error code in the registry 107 when the incidence count is equal to or greater than the threshold. The error code indicates that the kernel driver 115 fails to start as in step 211.

In step 212, the kernel driver 115 stops after setting the error code.

It is to be noted that the kernel driver stops in step 212 without waiting to receive a stop signal. This way, the kernel driver 115 does not have to operate to perform its function, which may cause the kernel driver 115 to crash again because of a bug in the kernel driver 115 or interoperability issue with other kernel drivers, for example.

Figure 3:
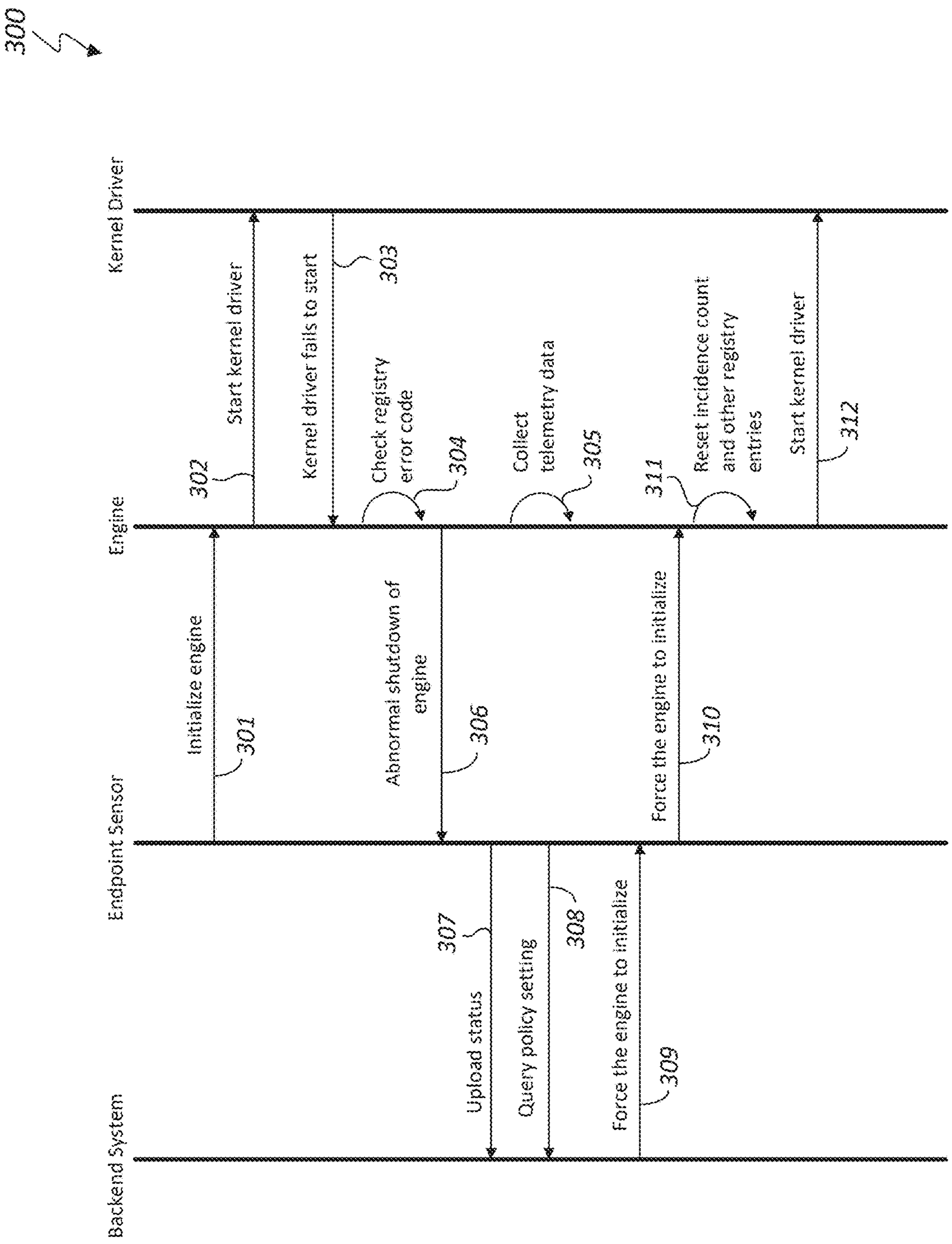
FIG. 3 shows a call diagram of a method of mitigating a BSOD error, in accordance with an embodiment of the present invention.

FIG. 3 shows a call diagram of a method 300 of mitigating a BSOD error, in accordance with an embodiment of the present invention. The method 300 is explained using the components of the system 100.

The endpoint sensor 113 initializes the engine 114 (step 301), such as when the endpoint sensor 113 is launched to execute. The engine 114 installs and then starts the kernel driver 115 (step 302) as part of the initialization of the engine 114. In this example, the kernel driver 115 fails to start (step 303) because the kernel driver 115 suffered a malfunction that caused a BSOD error. As explained with reference to FIG. 2, the kernel driver 115 sets an error code in the registry 107. The engine 114 detects that the kernel driver 115 fails to start by checking the registry 107 for the error code (step 304). The engine 114 proceeds to collect telemetry data of the start failure of the kernel driver 115 (step 305). The engine 114 may store the telemetry data in non-volatile storage so that the telemetry data can be retrieved later for analysis. The engine 114 cannot complete its initialization without a successful start of the kernel driver 115. Accordingly, the engine 114 notifies the endpoint sensor 113 that it is abnormally shutting down because the kernel driver fails to start (step 306).

The endpoint sensor 113 uploads a status report to the backend system 120 (step 307), with the status report indicating that the engine 114 cannot initialize because the kernel driver 115 fails to start. The endpoint sensor 113 queries the backend system 120 for a policy setting pertaining to the engine 114 not initializing because the kernel driver 115 fails to start (step 308). The policy setting may indicate not initializing the engine 114 until further commands from the backend system 120, for example while support personnel are troubleshooting the malfunction of the kernel driver 115.

Once the malfunction of the kernel driver 115 has been mitigated, e.g., when the kernel driver 115 has been patched, the backend system 120 may send a command to the endpoint sensor 113 to enforce a policy setting that indicates forcing the engine 114 to initialize (step 309). In accordance with the command, the endpoint sensor 113 sends a corresponding command to the engine 114 to force the engine 114 to initialize (step 310). Responsive to the command from the endpoint sensor 113, the engine 114 resets the incidence count and other registry entries of the kernel driver 115 (step 311). After resetting the incidence count and other registry entries of the kernel driver 115, the engine 114 starts the kernel driver 115 (step 312).

Figure 4:
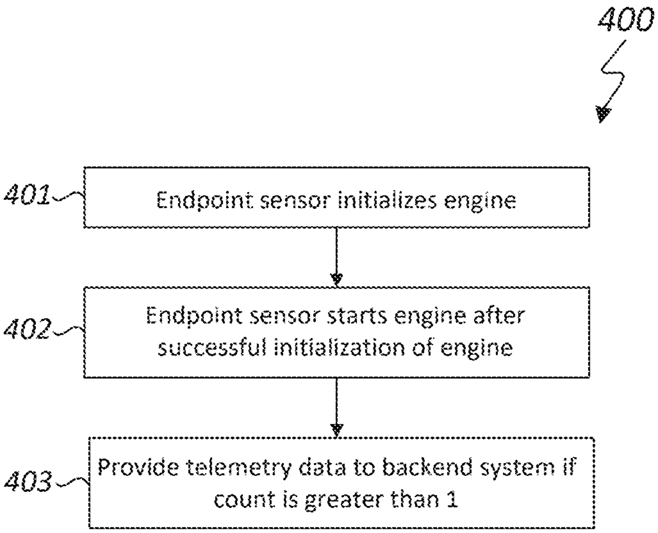
FIG. 4 shows a flow diagram of a method of collecting telemetry data of a kernel driver malfunction, in accordance with an embodiment of the present invention.

FIG. 4 shows a flow diagram of a method 400 of collecting telemetry data of a BSOD error, in accordance with an embodiment of the present invention.

In step 401, the endpoint sensor 113 initializes the engine 114. In step 402, the endpoint sensor 113 thereafter starts the engine 114 when the engine 114 successfully initializes.

In step 403, when the incidence count is greater than one, the engine 114 sends the telemetry data to the endpoint sensor 113, which forwards the telemetry data to the backend system 120.

Figure 5:
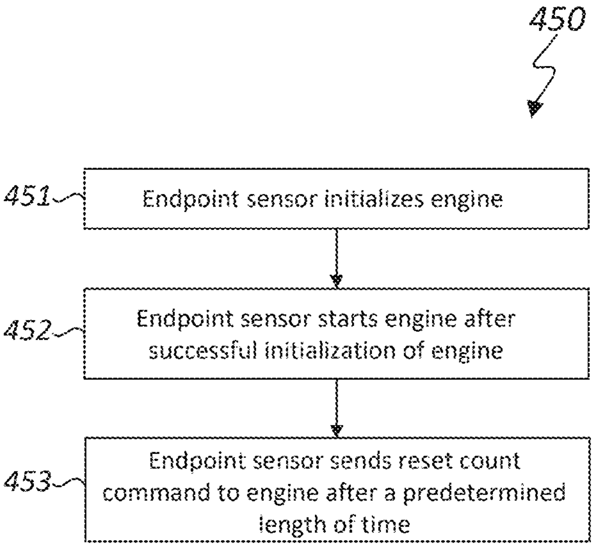
FIG. 5 shows a flow diagram of a method of resetting an indication of a BSOD error, in accordance with an embodiment of the present invention.

FIG. 5 shows a flow diagram of a method 450 of resetting an indication of a BSOD error, in accordance with an embodiment of the present invention. The method 450 may be performed to reset the incidence count during normal operation. The endpoint sensor 113 may initiate resetting the incidence count in response to a command from the backend system 120.

In step 451, the endpoint sensor 113 initializes the engine 114. In step 452, the endpoint sensor 113 thereafter starts the engine 114 after the engine 114 successfully initializes. In step 453, the endpoint sensor 113 sends a reset count command to the engine 114 after a predetermined length of time. In one embodiment, the endpoint sensor 113 sends the reset count command to the engine 114 after 15 minutes has elapsed since starting the engine 114. The engine 114 resets the incidence count responsive to the reset count command.

Embodiments of the present invention have been described using counters and registry entries, because the use of counters and registry entries are especially advantageous in the MICROSOFT WINDOWS operating system. However, other embodiments do not necessarily have to use counters and registry entries, as now explained with reference to FIG. 6.

Figure 6:
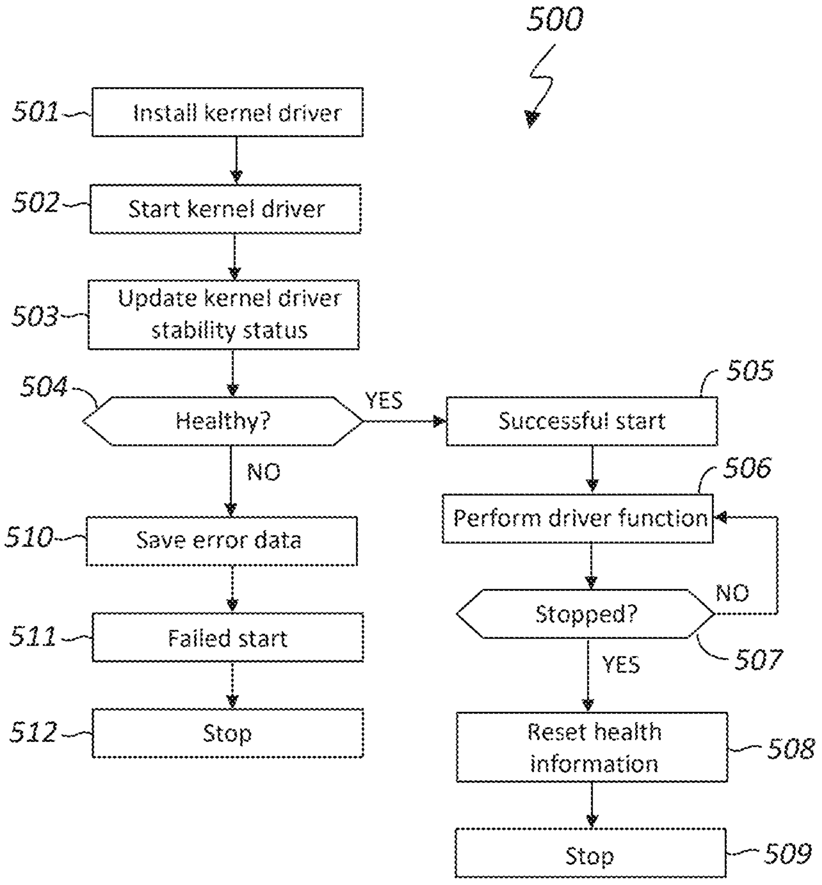
FIG. 6 shows a flow diagram of a method of preventing a BSOD loop, in accordance with another embodiment of the present invention.

FIG. 6 shows a flow diagram of a method 500 of preventing a BSOD loop, in accordance with an embodiment of the present invention. The method 500 may be performed to prevent a BSOD error from repeatedly occurring on the endpoint computer 110.

In step 501, the kernel driver 115 is installed using a suitable MICROSOFT WINDOWS API for installing a kernel driver.

In step 502, the engine 114 starts the kernel driver 115. Once started, the kernel driver 115 can proceed to perform operations in accordance with its function, which in one embodiment is to monitor system behavior on the endpoint computer 110.

In step 503, after being started, the kernel driver 115 performs a health check to update its stability status. The stability status of the kernel driver 115 is affected when the kernel driver malfunctions, such as when the kernel driver 115 crashes. For example, values stored by the kernel driver 115 in non-volatile memory during operation may indicate whether or not the kernel driver 115 was able to gracefully stop. As another example, the status of other components that interact with the kernel driver 115 may indicate whether the kernel driver 115 suffered a malfunction.

In step 504 to step 505, the kernel driver 115 starts successfully when the health check indicates that the kernel driver 115 is healthy, i.e., stable. The engine 114 is aware of the successful start of the kernel driver 115 by the absence of error data in non-volatile memory.

In step 506, the kernel driver 115 operates in accordance with its function.

In step 507 to step 506, the kernel driver 115 continues to operate to perform its function until the kernel driver 115 receives a stop signal from the engine 114 (or other component).

In step 507 to step 508, the kernel driver 115 resets its health information before stopping in step 509. The health information may include error data in non-volatile memory and other indicators of instability. The kernel driver 115 resets the health information to indicate that the kernel driver 115 is stable.

In step 504, when the health check of the kernel driver 115 indicates that the kernel driver 115 is not stable, i.e., not healthy, the kernel driver 115 stores data in non-volatile memory to indicate that it fails to start as in step 511. The kernel driver 115 thereafter stops as in step 512. The engine 114 checks the non-volatile memory at the next initialization of the engine 114 to detect that the kernel driver 115 fails to start.

With the method 500, a BSOD error may be mitigated as in the method 300 of FIG. 3, except that the error data is in any non-volatile memory (instead of being an error code in the registry 107) in step 304 and the health information of the kernel driver 115 is reset (instead of the incidence count and other registry entries) in step 311. Similarly, the health information of the kernel driver 115 may be reset as in the method 450 of FIG. 5, except that the endpoint sensor 113 sends a reset health information command (instead of a reset count command) to the engine 114 in step 453. Also, telemetry data may be collected as in the method 400 FIG. 4, except that telemetry data is forwarded to the backend system 120 when the kernel driver 115 is not healthy (instead of when the incidence count is greater than 1) in step 403.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of mitigating a blue screen of death error on a computer, the method comprising:

installing a kernel driver;

starting the kernel driver a first time after a reboot of the computer;

after starting the kernel driver the first time after the reboot of the computer and before the kernel driver performs operations in accordance with a function of the kernel driver, the kernel driver comparing an incidence count to a threshold after the kernel driver has been started;

when the incidence count is less than the threshold, the kernel driver: incrementing the incidence count, performing the operations in accordance with the function of the kernel driver after incrementing the incidence count, resetting the incidence count after receiving a stop signal to stop the kernel driver, and stopping the kernel driver after resetting the incidence count; and when the incidence count is equal to or greater than the threshold, the kernel driver: indicating the kernel driver fails to start and stopping the kernel driver.

2. The method of claim 1, wherein indicating the kernel driver fails to start includes setting an error code in a registry of an operating system of the computer.

3. The method of claim 1, further comprising:

when the incidence count is equal to or greater than the threshold: sending a report from the computer to a backend system over a computer network, the report indicating that the kernel driver fails to start.

4. The method of claim 3, further comprising:

sending a command from the backend system to the computer to start the kernel driver.

5. The method of claim 4, further comprising:

resetting the incidence count in response to the command from the backend system.

6. The method of claim 3, further comprising:

providing telemetry data of a failure of the kernel driver to start to the backend system.

7. A computer comprising at least one processor and a memory, the memory storing instructions that when executed by the at least one processor cause the computer to:

install a kernel driver;

start the kernel driver a first time after a reboot of the computer;

have the kernel driver, after the start of the kernel driver the first time after the reboot of the computer and before operations of the kernel driver are performed, check a stability status of the kernel driver;

when the stability status of the kernel driver indicates that the kernel driver is not stable, have the kernel driver stop the kernel driver; and when the stability status of the kernel driver indicates that the kernel driver is stable, perform the operations of the kernel driver.

8. The computer of claim 7, further comprising:

a non-volatile data storage device that stores error data when the kernel driver malfunctions.

9. The computer of claim 7, wherein the instructions stored in the memory when executed by the at least one processor cause the computer to:

reset health information of the kernel driver in response to receiving a command from a backend system over a computer network.

10. A system for mitigating a blue screen of death error, the system comprising:

an endpoint computer comprising at least one processor and a memory, the memory of the endpoint computer storing instructions that when executed by the at least one processor of the endpoint computer cause the endpoint computer to:

install a kernel driver;

start the kernel driver a first time after a reboot of the endpoint computer;

have the kernel driver, after the start of the kernel driver the first time after the reboot of the endpoint computer and before the kernel driver performs operations in accordance with a function of the kernel driver, check a stability status of the kernel driver;

when the stability status of the kernel driver indicates that the kernel driver is not stable, have the kernel driver stop the kernel driver; and when the stability status of the kernel driver indicates that the kernel driver is stable, have the kernel driver perform operations of the kernel driver; and a backend system comprising at least one processor and a memory, the memory of the backend system storing instructions that when executed by the at least one processor of the backend system cause the backend system to:

receive a report from the endpoint computer when the kernel driver fails to start; and provide a policy setting to the endpoint computer.

11. The system of claim 10, wherein the instructions stored in the memory of the endpoint computer, when executed by the at least one processor of the endpoint computer, cause the endpoint computer to:

reset a health information of the kernel driver in response to the policy setting indicating to start the kernel driver.

12. The system of claim 10, wherein the instructions stored in the memory of the endpoint computer, when executed by the at least one processor of the endpoint computer, cause the endpoint computer to:

when the kernel driver fails to start, save error data in non-volatile memory before stopping the kernel driver.

* * * * *